United States Patent [19]
M'Raihi et al.

[11] Patent Number: 5,625,695
[45] Date of Patent: Apr. 29, 1997

[54] PROCESS FOR GENERATING DSA SIGNATURES WITH LOW-COST PORTABLE APPARATUSES

[75] Inventors: David M'Raihi, Paris; David Naccache, Maisons-Alfort, both of France

[73] Assignee: Gemplus Card International, Gemenos, France

[21] Appl. No.: 347,570

[22] Filed: Nov. 30, 1994

[30] Foreign Application Priority Data

Dec. 2, 1993 [FR] France .................................. 93 14466
Mar. 29, 1994 [FR] France .................................. 94 03697

[51] Int. Cl.$^6$ ............................................. H04L 9/32
[52] U.S. Cl. ............................ 380/28; 380/29; 380/30; 380/25
[58] Field of Search ........................... 380/25, 29, 30, 380/28, 23, 49

[56] References Cited

U.S. PATENT DOCUMENTS

| | | | |
|---|---|---|---|
| 4,935,962 | 6/1990 | Austin | 380/25 |
| 5,068,894 | 11/1991 | Hoppe | 380/23 |
| 5,434,919 | 7/1995 | Chaum | 380/30 |

FOREIGN PATENT DOCUMENTS

WO-A-9303562 2/1993 WIPO.

OTHER PUBLICATIONS

T. Okamoto et al., *On Comparison of Practical Digital Signature Schemes*, NTT Review, Jan. 1993, vol. 5, No. 1.
B. Schneier, *Digital Signatures*, BYTE, Nov. 1993, vol. 18, No. 12, pp. 309–312.
S.M. Yen et al., *New Digital Signatures Scheme Based on Discrete Logarithm*, Electronic Letters, Nov. 1993, vol. 29, No. 12, pp. 1120–1121.

*Primary Examiner*—Thomas H. Tarcza
*Assistant Examiner*—Pinchus M. Laufer
*Attorney, Agent, or Firm*—Nilles & Nilles, S.C.

[57] ABSTRACT

The invention relates to a process for generating digital signatures from portable apparatuses (A1, A2, ... Ai ... An) of the microprocessor-based card type, including means for computation, communication and retention of data, which means comprise at least one electrically programmable non-volatile memory, consisting in preparing enciphered data constituting coupons and loading these coupons into the non-volatile memories so as later to use these coupons in order to sign a message sent by a verifier device. According to the process, the preparation of the coupons is carried out by a certified central authority B or by the card itself.

18 Claims, 4 Drawing Sheets

PROCESS FOR GENERATING DSA SIGNATURES WITH LOW-COST PORTABLE APPARATUSES

FIELD OF THE INVENTION

The present invention relates to a process making it possible to facilitate the digital generation of signatures of the DSA type (Digital Signature Algorithm, proposed by the *U.S. National Institute of Standards and Technology* (A Proposed Federal Information Processing Standard for Digital Signature Standard (DSS), Published in the Federal Register on 30 Aug. 1991, pp 42980–42982) by portable apparatuses, especially microprocessor cards devoid of hardware resources enabling arithmetic operations to be carried out on large numbers.

BACKGROUND OF THE INVENTION

Despite general promulgation and healthy acceptance of the concept of chip cards on the part of the public, most practical applications appeared only a few years ago principally owing to the limitations in the computational power of the cards. Progress in the sphere of non-volatile storage capacity of information, security and circuit technology (for example the EEPROM) encourage the rapid emergence of new generations of cards and of ever more ambitious applications such as the new American Digital Signature Standard (DSA).

The Digital Signature Standard (DSA) was proposed by the *U.S. National Institute of Standards and Technology* so as to provide an appropriate basis for applications requiring digital signatures instead of conventional signatures. A DSA signature is a pair of large numbers represented in a computer by strings of binary digits. The digital signature is computed with the aid of a series of computational rules (the DSA) and a set of parameters in such a way as to make it possible to certify both the identity of the signatory and the integrity of the data. The DSA makes it possible to generate and verify signatures.

The process for generating signatures makes use of a private key to produce a digital signature. The verification process uses a public key which corresponds to the secret key without however being identical to it. Each user possesses a pair of keys (public, secret). It is assumed that the public keys are known to everyone, whilst the secret keys are never disclosed. Anybody has the capacity to verify the signature of a user by using his public key but signatures cannot be generated other than by using the secret key of the user.

It will be recalled that the parameters of the DSA algorithm are:

① A prime p such that
$2^{L-1} < p < 2^L$ for $512 \leq L \leq 1024$ and $L=64 \alpha$ for any $\alpha$.

② A prime q such that
$2^{159} < q < 2^{160}$ and p−1 is a multiple of q.

③ A number g, of order q modulo p such that $$g = h^{\frac{p-1}{q}}$$

mod p, where h is any integer satisfying 1<h<p−1 and $$g = h^{\frac{p-1}{q}}$$

mod p>1.

④ A number x, generated randomly or pseudo-randomly.

⑤ A number y defined by the relation: $y=g^x$ mod p.

⑥ A number k generated randomly or pseudo-randomly such that 0<k<q.

The integers p, q and g are given parameters of the system which may be published and/or shared by a group of users. The secret and public keys of a signatory are x and y respectively. The parameters x and k are used for the generation of the signature and must be kept secret. The parameter k must be regenerated for each signature.

In order to sign a message m (hash value of an initial file M), the signatory computes the signature {r, 2} by:
$r=(g^k$ mod p) mod q and $$s = \frac{m + xr}{k}$$

mod q

Where the division by k is understood as modulo q (i.e. 1/k is the number k' such that k k'=1 mod q).
For example, if q=5 and k=3 then $$\frac{1}{k} = 2$$

since 3×2=6=1 mod 5.

After having tested that r≠0≠s, as explained in the description of the DSA, the signature {r, s} is sent to the verifier which computes:

①

$$w = \frac{1}{s}$$

mod q
② $u_1 = m$ w mod q
③ $u_2 = r$ w mod q
④ $v = (g^{u_1} y^{u_2}$ mod p) mod q
⑤ And compares whether v and r are equal so as to accept or reject the signature.

SUMMARY OF THE INVENTION

The present invention applies to any portable apparatus which includes computation means and storage means, it applies in particular to microprocessor-based chip cards. It applies accordingly to the cards which comply with the PCMCIA standard, to badge cards, and to cards read contactlessly.

The economic constraints related to the chip card market induce constant research with a view to improving retail costs. This effort often involves the use of the simplest possible products. This state of affairs prompts ever greater interest in solutions allowing implementation of public-key algorithms on inexpensive eight-bit type microcontrollers based on the 8051 (Intel) or 6805 (Motorola) for example.

To achieve this aim in the context of the implementation of the digital signature algorithm DSA, the proposed invention introduces the concept of signature coupons. This is a set of pre-computed certificates. These coupons are provided by a certified center (authority) in the course of a preliminary phase of on-line communication, or are obtained directly by the card.

The main advantage of signature coupons with regard to the above proposals in the digital signature sphere lies in the speed of computation of a DSA type signature by a card based on a straightforward 8-bit microcontroller (around 300 ms, transmission time inclusive) and the low memory occupancy of the coupon (only 28 bytes in EPROM or EEPROM or even 20 bytes for process variants described later.

The subject of the present invention is more particularly a process for generating digital signatures from portable apparatuses (A1, A2, ... Ai ... An), including means for computation, communication and retention of data, which means comprise at least one electrically programmable non-volatile memory, characterized in that it includes the following steps:

—preparation of enciphered data constituting coupons and loading of these coupons into the non-volatile memories, —use of these coupons to sign a message sent by a verifier device or certified authority.

The process for generating DSA signatures breaks down into two distinct phases: the loading of the coupon into the memory and the use of the coupon by the portable apparatus. In what follows, for simplicity, we shall speak of integrated-circuit cards in order to designate a portable apparatus. According to a first embodiment, the coupons are obtained by a certified central authority B having computation means and periodically establishing individual sessions with the apparatuses Ai, via a common communication interface, so as to send, to each apparatus, enciphered and pre-computed data which will enable the apparatus to generate a digital signature during a session of authentication using a public-key protocol.

Thus, in order to generate and load a coupon, the authority and the card carry out the following actions:

① The authority draws a random number J of Z1 bytes (in practice Z1 will be less than or equal to 20 bytes. We have preferentially chosen Z1=8).

② The authority expands J to obtain a number i of Z2 bytes, Z2 being greater than or equal to Z1 (we have chosen preferentially Z2=20)

③ The authority computes c=DES (card_key, J)

④ The authority back-computes $$k = \frac{1}{i}$$

mod q

⑤ The authority computes $r=(g^k \bmod p) \bmod q$

⑥ The authority sends c and r to the card

⑦ The card computes $J=DES^{-1}$ (card_key, c)

⑧ The card records J and r in EPROM (or EEPROM)

When the card wishes to sign a message m (use of a coupon to sign a message), the following protocol is used:

① The card extracts J and r from the EPROM (or EEPROM)

② The card expands J to obtain i on Z2 bytes

③ The card receives the message m from the verifier

④ The card computes s=(m+x r) i mod q

⑤ The card sends s and r to the verifier and invalidates the pair {r, J}, deleting it from the EEPROM.

In the embodiment just given, the DES key card_key can be part of x.

Furthermore, given that the number J will never exit plainly from the card, a rudimentary process of encipherment consisting of in a straightforward exclusive-OR of J with a constant key can replace the DES.

It may be remarked accordingly that it turns out to be advantageous to employ signature coupons and, in cases where a card regularly comes into contact with a remote and certified authority, the card can be reloaded.

According to a second embodiment, generation of the random number is effected by the card, this making it possible to avoid encipherment for the transmission of J. Computation of the inverse is done by hashing with the aid of the SHA function (Secure Hash Algorithm—FIPS PUB XX, Feb. 1, 1993, *Digital Signature Standard*), a message composed of the card's secret key x and of the random number J. Loading and use of a coupon thereby become simplified.

In order to generate and load a coupon, the authority and the card carry out the following steps:

① The card draws a random number J of Z1 bytes (preferably 10 bytes)

② The card sends J to the authority

③ The authority computes $$k = \frac{1}{SHA(x,J)}$$

mod q

④ The authority computes $r=(g^k \bmod p) \bmod q$

⑤ The authority sends r to the card

⑥ The card records J and r in EPROM (or EEPROM).

When the card wishes to sign a message m (use of a coupon to sign a message), the following protocol is used:

① The card extracts J and r from the EPROM (or EEPROM)

② The card receives the message m from the verifier

③ The card computes s=(m+x r) SHA(x, J) mod q

④ The card sends s and r to the verifier and invalidates the pair {r, J}, deleting it from the EEPROM.

According to a third embodiment of the process, the size of the coupons is reduced by considering the same random number J when computing the set of coupons. To do this, the $k_i$ are diversified by introducing the notion of rank represented by the variable i. The authority therefore computes the $k_i$ of n coupons as a function of x, J and i. This method makes it possible to load into the card just a single value J common to the set of coupons which entail no more than 20 bytes, the size of the value $r_i$ representing the coupon.

Thus, to generate and load the coupons, the authority and the card carry out the following actions:

① The card draws a random number J of Z1 bytes (preferably 10 bytes) and records it in EPROM (or EEPROM)

② The card sends J to the authority

③ The authority computes $k_i$ for i=1 to n, where n represents the number of coupons to be loaded as follows:

For i=1 to n:

$$k_i = \frac{1}{SHA(x,J,i)}$$

mod q

④ The authority computes the corresponding $r_i$:

$r_i$ $(g^k_i \bmod p) \bmod q$

⑤ The authority sends the $r_i$ to the card

⑥ The card records the $r_i$ in EPROM (or EEPROM).

When the card wishes to sign a message m (use of a coupon to sign a message), the following protocol is used:

① The card extracts J and an $r_i$ from the EPROM (or EEPROM)

② The card receives the message m from the verifier

③ The card computes s=(m+x $r_i$) SHA(x, J, i) mod q

④ The card sends s and $r_i$ to the verifier and invalidates $r_i$ deleting it from the EEPROM.

The employing of signature coupons can be extended to a great variety of cryptosystems of the DSA type where pre-computation is possible (Schnorr, Guillou-Quisquater, etc.).

On this subject, it is recalled that in the signature scheme proposed by C. P. Schnorr (Efficient Signature Generation by Smart Cards—C. P. Schnorr—European Patent 89103290.6), the signature generation process also makes use of a private key in order to produce a digital signature. The verification process uses a public key which corresponds to the secret key without however being identical to it.

Each user therefore possesses a pair of keys (public, secret). It is assumed that the public keys are known to everyone, whilst the secret keys are never disclosed. Anybody has the capacity to verify the signature of a user by using his public key but signatures cannot be generated other than by using the secret key of the user.

It is also recalled that the parameters of the Schnorr system are:

① Two primes p and q such that $q|p-1$, $q \geq 2^{140}$, $p \geq 2^{512}$,
② A number $\alpha$ of order q modulo p, that is to say satisfying $\alpha^q = 1 \pmod p$, $\alpha \neq 1$
③ A one-way hashing function (for example the SHA)
④ A number s generated randomly or pseudo-randomly
⑤ A number v defined by the relation: $v = \alpha^{-s} \bmod p$ The integers p, q and $\alpha$ are parameters of the system which can be published and/or shared by a group of users. The secret and public keys of a signatory are s and v respectively. The parameter s is used for the generation of the signature and must be kept secret.

According to a fourth embodiment of the invention, generation and loading of a coupon are then effected as follows:

① The card draws a random number J of Z1 bytes (preferably 10 bytes) and records it in EPROM (or EEPROM)
② The card sends J to the authority
③ The authority computes the $x_i$ for i=1 to n, with n the number of coupons to be loaded as follows:
For i=1 to n:
$x_i = \alpha^{SHA(s,J,i) \bmod q} \bmod p$
④ The authority sends the $x_i$ to the card
⑤ The card records the $x_i$ in EPROM (or EEPROM).

When the card wishes to sign a message m, the following protocol is used:

① The card extracts J and an $x_i$ from the EPROM (or EEPROM)
② The card receives the message m from the verifier
③ The card computes $e = SHA(m, s) \bmod q$
④ The card computes $y = SHA(s, J, i) + se \bmod q$
④ The card sends $x_i$ and y to the verifier and invalidates the coupon $\{x_i\}$, deleting it from the EEPROM.

The process according to the invention also has the objective of reducing the time required to generate a signature. According to a preferred embodiment, to do this use is made of a card provided with a cryptographic operator (for example, of the Philips 83C852 type), and computation of the term $r = (g^k \bmod p) \bmod q$ is deferred to the moment of verification so as to be able to profit from the verifier's work time.

In this protocol, the card itself recomputes its coupon $\{r, k\}$ during verification. The first coupon is loaded into the card in the personalization phase. The coupon must be written into a read and write-protected area so as to ensure the security of the system.

Thus,

① The card extracts r and k from the EEPROM (or EPROM)
② The card receives the message m from the verifier
③ The card computes $$s = \frac{m + xr}{k}$$

mod q

④ The card sends r and s to the verifier and invalidates r, deleting it from the EEPROM
⑤ While the verifier is verifying the validity of the pair $\{r, s\}$, the card draws a new random number k of 20 bytes and back-computes, computes $r = (g^k \bmod p) \bmod q$ and overwrites the EPROM (or EEPROM) with the new coupon $\{r, k\}$.

The process according to the invention also has the objective of proposing a means of rapid and simultaneous loading of n coupons.

In the case where the authority generates the random numbers J, the process then includes the following steps:

① The authority computes, for b=1 to n:
$J_b$ = random number of Z1 bytes
$i_b$ = expand $(J_b)$ $$k_b = \frac{1}{i_b}$$

mod q
$R_b = 1$
② The authority computes:
Acc = g
For a=0 to 159 do
{
For b=1 to n do if $k_b[a] == 1$ then $R_b = R_b$ Acc mod q
Accm = $Acc^2$ mod p
}
For b=1 to n: $coupon_b = \{R_b \bmod q, J_b\}$
③ The authority sends the n coupons to the card.

The invention has a further objective of proposing a means of rapid and simultaneous loading of n coupons by the authority in the case where the card generates the random number J:

① The card generates a random number J, records it in EPROM (or EEPROM) and sends it to the authority
② The authority computes, for b=1 to n:

$$k_b = \frac{1}{SHA(x,J,b)}$$

mod q
$R_b = 1$
③ The authority computes:
Acc = g
For a=0 to 159 do
{
For b=1 to n do if $k_b[a] == 1$ then $R_b = R_b$ Acc mod q
Acc = $Acc^2$ mod p
}
For b=1 to n: $r_b = R_b \bmod q$
④ The authority sends the values $r_b$ of the n coupons to the card which records them in EPROM (or EEPROM) after J.

This method of rapid loading of n coupons can of course be extended to all types of coupon (Schnorr, Guillou-Quisquater, etc).

The invention also has the objective of proposing a method making it possible to limit the use of the coupons inside a geographical area and/or within a given time interval.

The authority generates a DSS signature which will serve as certificate to a set of coupons. This signature is verified by the terminal when using the coupon so as to ensure that the coupons can actually be used in this context.

Consider a set of n coupons. The certificate corresponding to them is computed by the authority at the moment of the loading of the coupons:

(R,S)=DSS$_{AUTHORITY}$SHA(Control_Datum, $r_1, \ldots r_n$)).

The control data can be the concatenation of various information items such as a limit date and/or a geographical area pointer (post code for example). In the context of a system with n 20-byte coupons, using a common random value J, the loading and use of the coupons operates thus:

① The card draws a random number J of Z1 bytes (10 bytes) and records it in EPROM (or EEPROM)
② The card sends J to the authority
③ The authority computes the $k_i$ for i=1 to n, with n the number of coupons to be loaded, and the corresponding ri [sic], as follows:

For i=1 to n:

$$k_i = \frac{1}{SHA(x,J,i)}$$

mod q $r_i = (g^{k_i} \bmod p) \bmod q$

④ The authority computes the Certificate (R, S) corresponding to the n coupons:
Let X be the secret key of the authority
① The authority generates a random number K
② M=Hash (Control_Datum, $r_1, r_2, \ldots, r_n$)
③ R=($g^k \bmod p$) mod q
④

$$S = \frac{M + XR}{K}$$

mod q

⑤ The authority sends the Certificate (R,S), the control data Control_Datum and the $r_i$ to the card.
⑥ The card records the Certificate (R,S), the control data and the $r_i$ in non-volatile memory EPROM (or EEPROM).

It is possible to limit the number of data to be sent by organizing the coupons into a binary tree in a manner which is known to those skilled in the art. The choice of the hashing method by those skilled in the art will therefore depend essentially on the way they desire to organize the data and on the possible gains in respect of the ratio of transmission time to computation time which they wish to obtain.

When the card wishes to sign a message m, the following steps are implemented:
① The card extracts J and an $r_i$ from the EPROM (or EEPROM)
② The card receives the message m from the verifier
③ The card computes s=(m+x $r_i$) SHA(x,J,i) mod q
④ The card sends s, $r_i$, the Certificate and the data required for its verification to the verifier and invalidates $r_i$, deleting it from the EEPROM.

BRIEF DESCRIPTION OF THE DRAWINGS

Other features and advantages of the invention will emerge from reading the following description which is given by way of illustrative and non-limiting example and in connection with the appended drawings in which.

MORE DETAILED DESCRIPTION OF THE PREFERRED EMBODIMENTS

Figure 1:
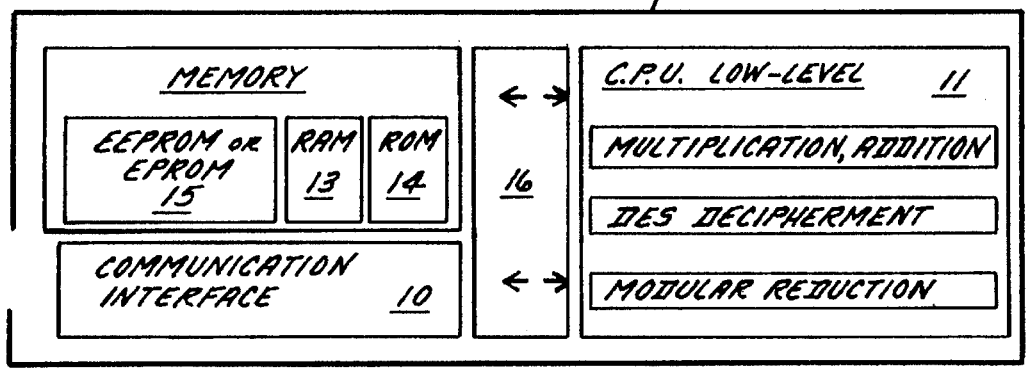
FIG. 1 represents the layout of an apparatus Ai able to implement the system proposed by the present invention.
Figure 2:
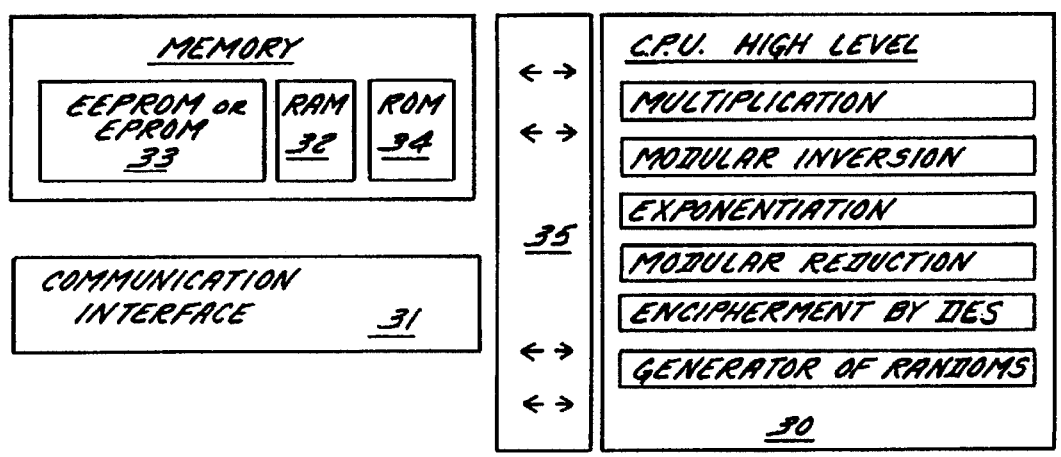
FIG. 2 represents the layout of a certified authority able to implement the system proposed by the present invention.
Figure 3:
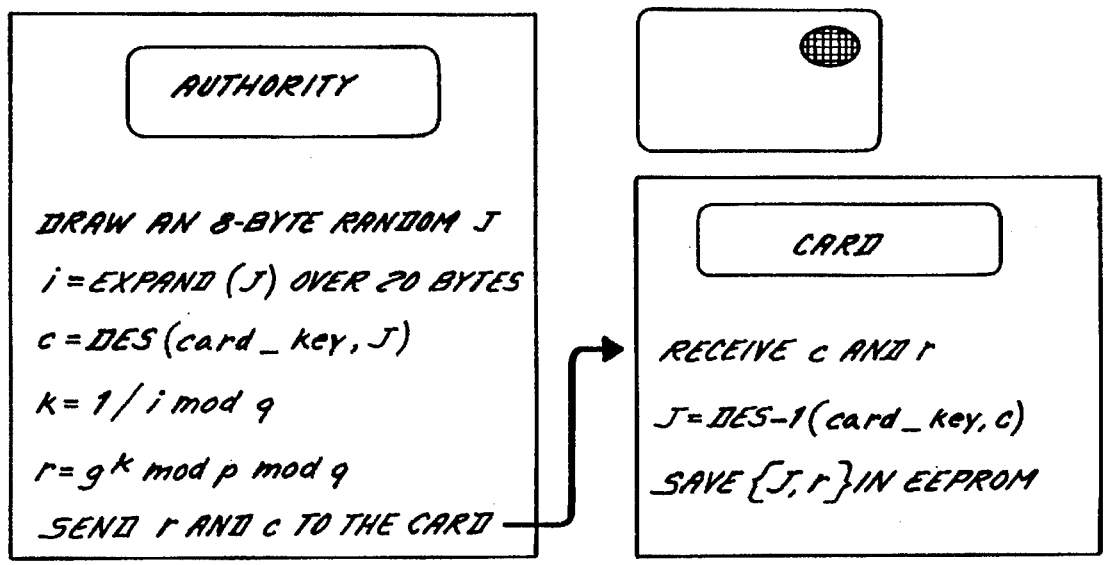
FIG. 3 represents the data transmitted between an apparatus Ai such as an integrated-circuit card and the authority, during the phase for loading a coupon in the case where the authority generates the random number.
Figure 4:
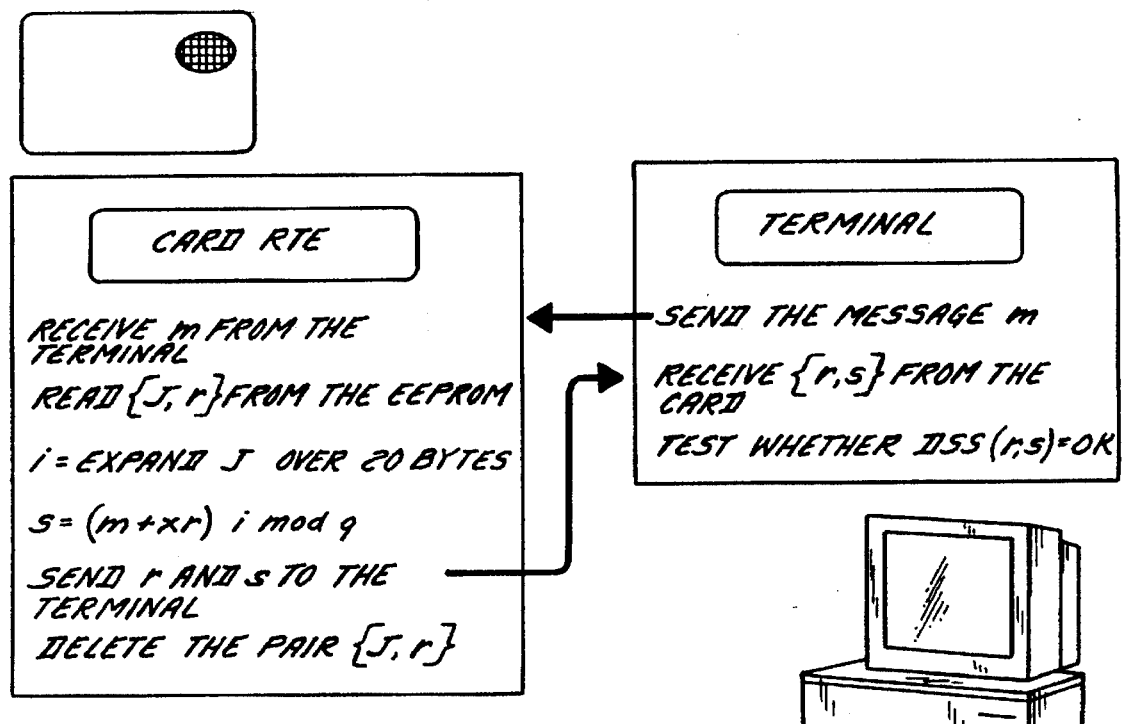
FIG. 4 describes the data transmitted between the card and the verifier at the moment of use of the coupon in the case where the authority generates the random number.
Figure 5:
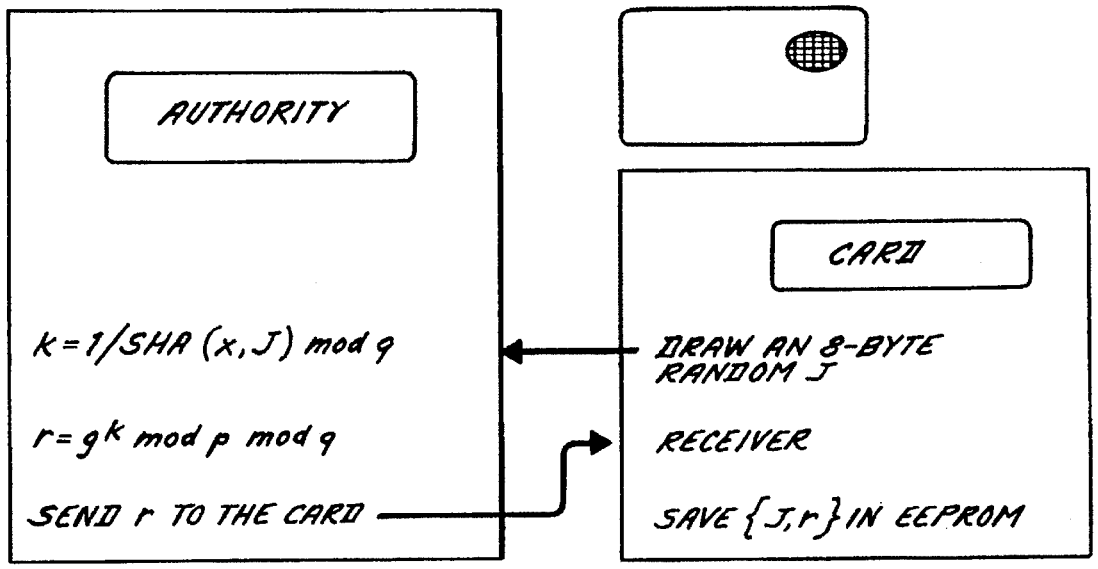
FIG. 5 represents the data transmitted between the chip card and the authority during the phase for loading a coupon in the case where the card generates the random number.
Figure 6:
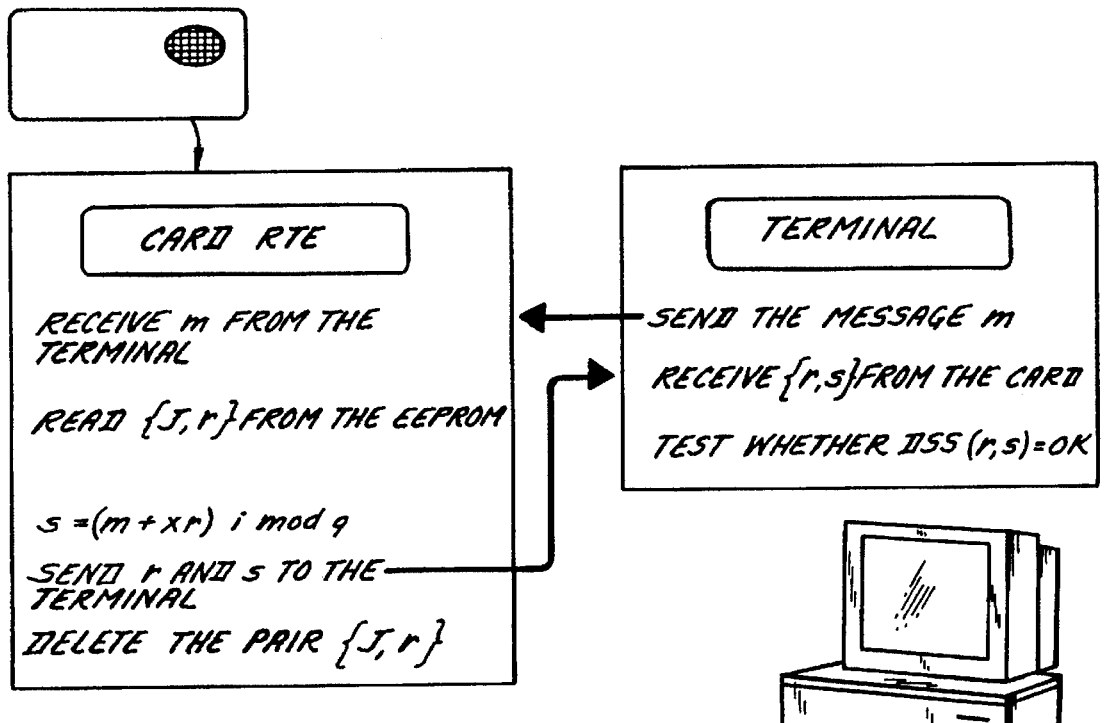
FIG. 6 describes the data transmitted between the card and the verifier at the moment of use of the coupon in the case where the card generates the random number.
Figure 7:
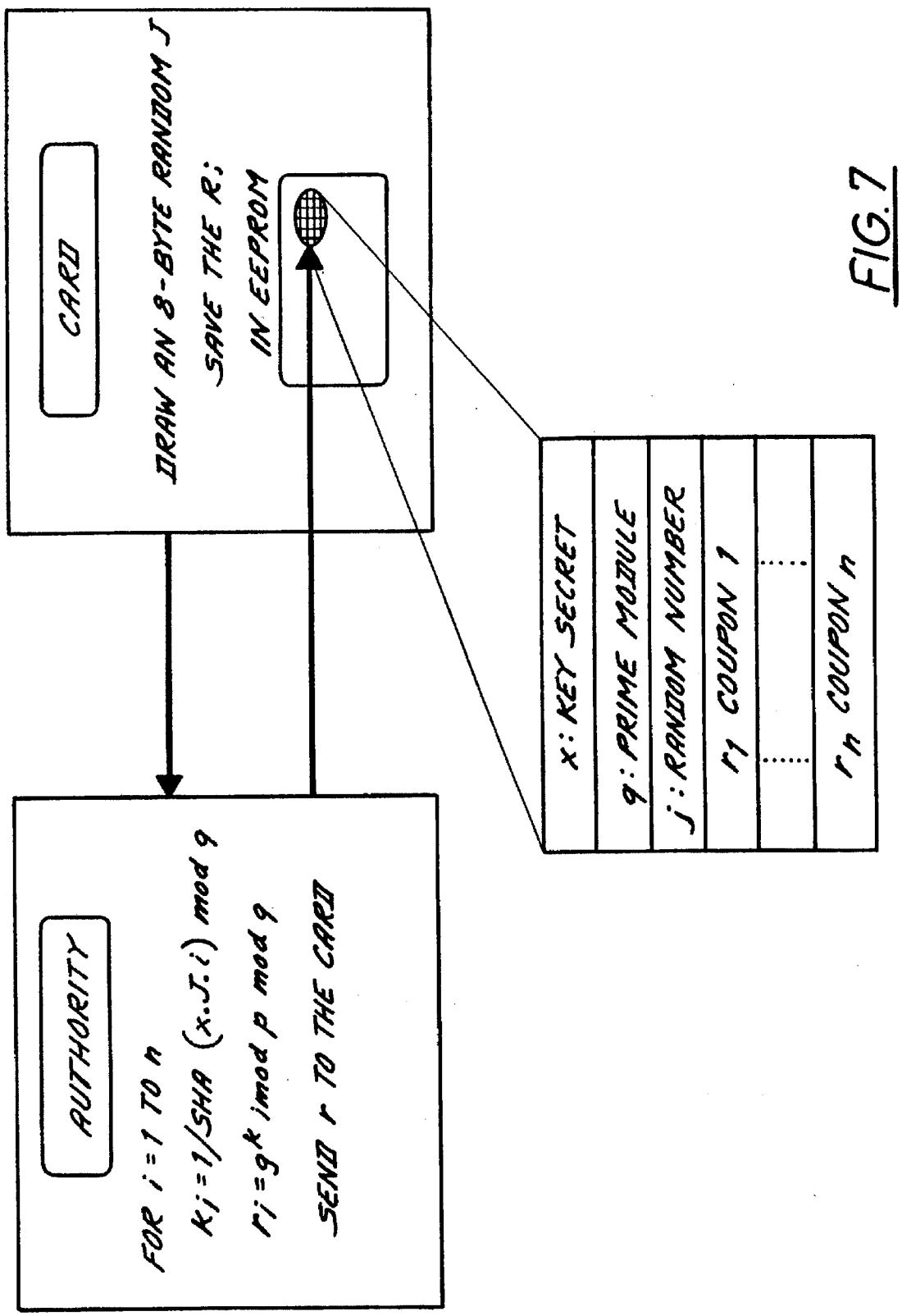
FIG. 7 describes the organization of the memory of a card after loading n coupons in the general case where the card generates the random number.

As stated at the start of the description, for simplicity we shall speak of an integrated-circuit card, it being understood that it could be any portable apparatus possessing a microprocessor, a communication interface and storage means.

Furthermore, the invention applies just as well to a system in which an authority delivers the coupons as in the case of the integrated-circuit cards possess a conventional cryptographic operator circuit and are accordingly able to generate the coupons.

According to the proposed invention, each integrated-circuit card is composed of a processing unit (CPU) 11, a communication interface 10, a random-access memory (RAM) and/or a non-writable memory (ROM) 14 and/or a writable memory (generally overwritable) (EPROM or EEPROM) 15.

The CPU 11 and/or the ROM 14 of the card contain the programs or the computational resources corresponding to the second part of the DSS protocol (computation rules for generating s and for using the hashing function SHA), multiplication, addition and modular reduction. Some of these operations can be grouped together (for example, modular reduction can be incorporated directly into multiplication).

In the same way as for the implementation of the DSS, the RAM memory contains the message M to which the hashing function SHS is applied and the computation rules for generating DSS signatures. The EPROM (or EEPROM) 15 contains the parameters p, q, g, x and the coupon set $\{r_i, J_i\}$ generated and used as stated in the description which follows.

The card has means of decipherment (for example the program for the DES algorithm), for which it possesses the secret key.

The CPU 11 controls, via the address and data buses 16, the communication interface 10, the memory read and write operations 13, 14 and 15.

Each chip card is protected from the outside world by physical protections 17. These protections should be sufficient to prevent any unauthorized entity from obtaining the secret key x. The techniques most used nowadays in this sphere are the incorporation of the chip into a security module and the equipping of the chips with devices capable of detecting variations in temperature and light as well as abnormal voltages and clock frequencies. Special design techniques such as the scrambling of memory access are also used.

According to the proposed invention, the authority is composed of a minimum of a processing unit (CPU) 30 and memory resources 32, 33 and 34.

The CPU 30 controls, via the address and data buses 35, the communication interface 31, the memory read and write operations 32, 33 and 34.

The CPU 30 and/or the ROM 34 of the authority contain the programs or computational resources making it possible to implement all of the DSS protocol (computation rules and hashing function SHS), multiplication, addition, modular inverse, exponentiation and modular reduction. Some of these operations can be grouped together (for example, modular reduction can be incorporated directly into multiplication).

The authority also has means of encipherment (for example the program for the DES algorithm), for which it possesses the secret key. In the contrary case, the generation of the random numbers J is carried out by the card. To do this, the authority or the card have a random number generator.

In the general context of the proposed invention and according to a first embodiment, the remote loading and the use of the coupons are carried out by exchanging between the card, the authority and the verifier, at least the following signals:

In order to load a coupon remotely, the authority draws a random number of Z1 bytes J, expands it to obtain a number i of Z2 bytes, computes c=DES (card_key, J) and back-computes $$k = \frac{1}{i}$$

mod q.

Afterwards, the authority computes $r=(g^k \mod p) \mod q$, sends c and r to the card which then computes $J=DES^{-1}$ (card_key, c) and records J and r in the EPROM (or EEPROM).

Preferably Z1=8 and Z2=20.

When the card wishes to sign a message m, it extracts J and r from the EPROM (or EEPROM), expands J to obtain a number i of 20 bytes and computes s=(m+x r) i mod q.

Afterwards, the signature {r, s} is sent to the verifier and the pair {r, J} is invalidated (deleted from the EEPROM).

According to a second embodiment, generation of the random number J is transferred to card level. The remote loading and the use of the coupons are carried out by exchanging between the card, the authority and the verifier, at least the following signals:

In order to load a coupon remotely, the card draws a random number of 18 bytes J, and sends it to the authority.

Afterwards, the authority back-computes $$k = \frac{1}{SHA(x,J)}$$

mod q mod q and $r=(g^k \mod p) \mod q$, sends r to the card which records J and r in the EPROM (or EEPROM).

When the card wishes to sign a message m, it extracts J and r from the EPROM (or EEPROM) and computes the second part of the signature:
s=(m+x r) SHA(x,J) mod q.

Afterwards, the signature {r, s} is sent to the verifier and the pair {r, J} is invalidated (deleted from the EEPROM).

According to a variant realization, in the case where a card is provided with a cryptographic operator (for example, of the Philips 83C852 type) and where accordingly it is able to generate the coupons, the time required for the generation of a DSS signature is reduced by deferring computation of the term $r=(g^k \mod p) \mod q$ to the moment of verification so as to be able to profit from the verifier's work time.

In this protocol, the card itself recomputes its coupon during verification.

① The card extracts r and k from the EEPROM (or EPROM)
② The card receives the message m from the verifier
③ The card computes $$s = \frac{m + xr}{k}$$

mod q
④ The card sends r and s to the verifier and invalidates r, deleting it from the EEPROM
⑤ While the verifier is verifying the validity of the pair {r, s}, the card draws a new random number k of 20 bytes and back-computes, computes $r=(g^k \mod p) \mod q$ and overwrites the EPROM (or EEPROM) with the new coupon {r, k}.

According to another variant realization, the process makes it possible to obtain rapid and simultaneous loading of n coupons by the authority. The case is also distinguished in which the authority generates the random number J of the latter or it is the card which carries out this operation:
Case 1: The authority generates the random numbers $J_b$
① The authority computes, for b=1 to n:
$J_b$=random number of 8 bytes
$i_b$=expand ($J_b$)

$$k_b = \frac{1}{i_b}$$

mod q
$R_b=1$
② The authority computes:
Acc=g
For a=0 to 159 do
{
For b=1 to n do if $k_b[a]==1$ then $R_b=R_b$ Acc mod q
Acc=Acc$^2$ mod p
}
For b=1 to n: coupon$_b$={$R_b$ mod q, $J_b$}
③ The authority sends the n coupons to the card.
Case 2: The card generates the random number J
① The card generates a random number J, records it in EPROM (or EEPROM) and sends it to the authority
② The authority computes, for b=1 to n:

$$k_b = \frac{1}{SHA(x,J,b)}$$

mod q
$R_b=1$
③ The authority computes:
Acc=g
For a=0 to 159 do
{
For b=1 to n do if $k_b[a]==1$ then $R_b=R_b$ Acc mod q
Acc=Acc$^2$ mod p
}
For b=1 to n: $r_b=R_b$ mod q
④ The authority sends the values $r_b$ of the n coupons to the card which records them in EPROM (or EEPROM) after J.

The proposed invention makes it possible moreover to control coupon use based on the notion of certification. The authority computes a certificate for a set of coupons at the moment of their loading and transmits it, together with the data which allowed its computation, to the card:

The card sends J to the authority which computes the $k_i$ and the $r_i$, with n the number of coupons to be loaded as follows:

For i=1 to n:

$$k_i = \frac{1}{SHA(x,J,i)}$$

mod q $r_i = (g^{k_i} \bmod p) \bmod q$

Then the authority computes the Certificate of the n coupons: it generates a random number K and computes $R = g^K \bmod p \bmod q$ and $$S = \frac{M + XR}{K}$$

mod q with M=Hash (Control_Datum, $r_1, r_2, \ldots, r_n$).

It is possible to limit the number of data to be sent by organizing the coupons into a binary tree in a manner which is known to those skilled in the art. The choice of the hashing method by those skilled in the art will therefore depend essentially on the way in which they desire to organize the data and on the possible gains in respect of the ratio of transmission time to computation time which they wish to obtain.

Finally, the authority sends the Certificate (R, S), the control data and the $r_i$ to the card which records everything in EPROM (or EEPROM).

For numerous portable objects such as PCMCIA cards, notebooks, or alternatively in the context of applications around super data highways, the data transmission time is negligible by comparison with that devoted to the computation of a modular exponentiation. Therefore, the proposed invention offers interesting possibilities for performance gains which the current state of the art does not allow.

We claim:

1. Process for generating digital signatures with a portable apparatus of the microprocessor-based integrated-circuit card type, the portable apparatus including a microprocessor, a communication device, and an electrically programmable non-volatile memory, the method comprising the steps of preparing a plurality of original coupons, the plurality of original coupons being prepared externally to the portable apparatus, the plurality of original coupons being formed of precomputed data useful in the generation of the digital signatures, wherein different coupons correspond to different individual signatures such that the generation of an individual signature involves the use of only a single coupon, and wherein the plurality of original coupons each correspond to an intermediate step in the calculation of the different individual signatures;

loading the plurality of original coupons into the portable apparatus after the plurality of original coupons have been prepared;

using the plurality of original coupons to generate the digital signatures; and periodically reloading the apparatus with pluralities of additional coupons after the apparatus has been issued to an end user and after the plurality of original coupons has been substantially exhausted, each performance of the reloading step comprising the steps of establishing a connection between a signature verification device and the apparatus, the signature verification device being formed of one of a verifier and a certified central authority, preparing a plurality of additional coupons, enciphering the plurality of additional coupons, and sending the plurality of additional coupons from the signature verification device to the apparatus in enciphered format, the plurality of additional coupons enabling the apparatus to generate a plurality of additional digital signatures.

2. Process according to claim 1, wherein the digital signatures are generated using the DSA algorithm, and wherein the step of preparing a plurality of additional coupons includes the steps of drawing a random number J of Z1 bytes, and expanding the number J into a Z2-byte number i, computing $$k = \frac{1}{i}$$

mod q, and computing $r = (g^k \bmod p) \bmod q$, and wherein the step of enciphering the plurality of additional coupons includes the step of computing c=DES (card_key, J), and wherein the step of sending the plurality of additional coupons from the signature verification device to the apparatus includes the steps of the signature verification device sending c and r to the apparatus, the apparatus deciphering the plurality of additional coupons by computing J=DES$^{-1}$ (card_key, c), and the apparatus saving J and r in the non-volatile memory, c and r thus forming the coupon in enciphered format and J and r forming the coupon in deciphered format.

3. Process according to claim 2 wherein the c and r sending step is repeated t times so as to culminate with the saving of t different pairs {J, r} in the non-volatile memory.

4. Process according to claim 3 wherein the card generates the DSA signature of a message m by performing the following operations:

a. extracting J and r from the non-volatile memory, b. expanding J into a Z2-byte number i, c. computing s=(m+x r) i mod q, x being the secret DSS (Digital Signal Standard) key held by the portable apparatus, d. sending s and r to the verifier, and e. invalidating the pair {J, r}, including deleting it from the non-volatile memory.

5. Process according to claim 2, wherein the portable apparatus is a card, and wherein the parameter card_key is derived directly from the secret DSS (Digital Signal Standard) key x held by the card.

6. Process according to claim 2, wherein in order to reduce the time for generating a DSA signature with an apparatus provided with a cryptographic operator, the process further comprises the step of deterring computation of the term $r = (g^k \bmod p) \bmod q$ to the moment of verification of the digital signature by the signature verification device, thus enabling r to be computed during the signature verification device's work time.

7. Process according to claim 6, further comprising the following steps performed by the portable apparatus:
   extracting J and r from the non-volatile memory,
   expanding the J to obtain i on Z2 bytes,
   receiving the message m from the signature verification device,
   computing s=(m+x r) i mod q,
   sending s and r to the verifier and
   invalidating the pair {r, J}, deleting it from the non-volatile memory,
   and while the signature verification device is verifying the validity of the pair {r, s}, drawing a new random number J of Z1 bytes and expanding the number J so as to obtain a number i of Z2 bytes, back-computing $$k = \frac{1}{i}$$

mod q, computing r=($g^k$ mod p) nod q and overwriting the non-volatile memory with the new coupon {r, J}.

8. Process according to claim 1, wherein the digital signatures are generated using the DSA digital signature algorithm, and wherein the exchanging of data between the apparatus and the signature verification device includes the following steps:
   the apparatus drawing a random number J of Z1 bytes, and sending the number J to the signature verification device,
   the signature verification device computing $$k = \frac{1}{SHA} (x,J)$$

mod q and r=($g^k$ mod p) mod q, SHA being the secure Hash Algorithm, and x being the secret key held by the portable apparatus, and
   sending r to the apparatus which records J and r in the non-volatile memory.

9. Process according to claim 8, wherein the apparatus generates the DSA signature of a message m by performing the following operations:
   a. extracting J and r from the non-volatile memory,
   b. computing s=(m+x r) SHA (x, J) mod q,
   c. sending r and s to the signature verification device, and
   d. invalidating the pair {J, r}, including deleting it from the non-volatile memory.

10. Process according to claim 1 wherein, during the enciphering step, the plurality of additional coupons are enciphered using an exclusive-OR with a secret constant.

11. Process for generating digital signatures according to claim 1, wherein the apparatus generates a DSA signature of a message m by performing at least the following operations after (1) n coupons $r_1, \ldots, r_n$ are sent to the portable apparatus and stored in the non-volatile memory and (2) after a random number J is generated by the portable apparatus and stored in the non-volatile memory:
   a. extracting J and an $r_b$ from the non-volatile memory,
   b. computing s=(m+x $r_b$) SHA (x,J,b) mod q, SHA being the Secure Hash Algorithm,
   c. sending $r_b$ and s to the verifier, and
   d. invalidating the coupon $r_b$, including deleting it from the non-volatile memory.

12. Process for generating digital signatures according to claim 1, wherein the apparatus generates a Schnorr signature of a message m by performing the following operations after (1) n coupons $x_1, \ldots, x_b$ are sent to the portable apparatus and stored in the non-volatile memory and (2) after a random number J is generated by the portable apparatus and stored in the non-volatile memory:
   a. extracting J and $x_b$ from the non-volatile memory,
   b. computing c=SHA (m, s) mod q, SHA being the Secure Hash Algorithm,
   c. computing y=SHA (s, J, b)+se mod q,
   d. sending $x_b$ and y to the verifier, and
   e. invalidating the coupon {$X_b$}, including deleting it from the non-volatile memory.

13. Process for generating digital signatures according to claim 1, wherein the preparation of the enciphered data constituting the coupons furthermore includes the following step:
   for a set of n coupons, computing a certificate (R, S) on the basis of a DSS (Digital Signal Standard) algorithm and of control data such that (R,S)=DSS (SHA (Control_Datum, $r_1, r_2, \ldots, r_n$)), SHA being the Secure Hash Algorithm.

14. Process for generating digital signatures according to claim 13, wherein the signature verification device computes the certificate for a set of n coupons, and wherein the generation and reloading of the coupons then includes the following steps:
   1. the apparatus drawing a random number J of Z1 bytes (8 bytes) and recording it in the non-volatile memory,
   2. the apparatus sending J to the signature verification device,
   3. the signature verification device computing the $k_i$ for i=1 to n, with n being the number of coupons to be loaded, and the corresponding $r_i$, as follows:
   For i=1 to n:

$$k_i = \frac{1}{SHA(x,J,i)} \mod q$$

$r_i$=($g^{k_i}$ mod p) mod q
   4. the signature verification device computing the Certificate (R, S) corresponding to the n coupons:
   X being the secret key of the signature verification device
   1. the signature verification device generating a random number K,
   2. M=Hash (Control_Datum, $r_1, r_2, \ldots, r_n$),
   3. R=($g^k$ mod p) mod q, $$4. S = \frac{M + XR}{K} \mod q,$$

5. the signature verification device sending the Certificate (R, S), the control data and the $r_i$ to the apparatus, and
   6. the apparatus recording the Certificate (R,S), the control data and the $r_i$ in the non-volatile memory.

15. Process for generating digital signatures according to claim 14, wherein the signing of a message m by the apparatus includes the following steps:
   1. the apparatus extracting J and an $r_i$ from the non-volatile memory,
   2. the apparatus receiving the message m from the signature verification device,
   3. the apparatus computing s=(m+x $r_i$) SHA (x,J,i) mod q, x being the secret key of the portable apparatus, and SHA being the Secure Hash Algorithm, 4. the apparatus sending s, $r_i$, the Certificate and the data required for its verification to the signature verification device and invalidating $r_i$, deleting it from the non-volatile memory.

16. Process for generating digital signatures according to claim 1, wherein there are a plurality of apparatuses, and wherein the apparatuses are one of chip cards, PCMCIA cards, badges, and contactless cards.

17. Process for generating digital signatures according to claim 1, wherein communication between the apparatus and the signature verification device is carried out by exchanging electronic signals.

18. Process for generating digital signatures according to claim 1, wherein communication between the apparatus and the signature verification device is carried out by exchanging one of radio waves and infrared signals.

* * * * *